(12) United States Patent
Tenny

(10) Patent No.: US 8,630,228 B2
(45) Date of Patent: Jan. 14, 2014

(54) METHOD AND APPARATUS FOR PROVIDING POSITION RELATED DATA

(75) Inventor: Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 12/722,316

(22) Filed: Mar. 11, 2010

(65) Prior Publication Data

US 2010/0232362 A1    Sep. 16, 2010

Related U.S. Application Data

(60) Provisional application No. 61/159,765, filed on Mar. 12, 2009.

(51) Int. Cl.
*H04W 4/00* (2009.01)
(52) U.S. Cl.
USPC ........................................................ 370/328
(58) Field of Classification Search
USPC .......... 455/456.1–456.6, 422.1, 67.11, 67.13, 455/440, 68, 561, 434, 423, 466; 370/328, 370/330, 329, 331
See application file for complete search history.

(56) References Cited

U.S. PATENT DOCUMENTS

| | | | |
|---|---|---|---|
| 5,361,256 A | 11/1994 | Doeringer et al. | |
| 8,200,238 B2 * | 6/2012 | Gildea | 455/456.1 |
| 8,223,069 B2 * | 7/2012 | Wang et al. | 342/357.43 |
| 8,279,791 B2 * | 10/2012 | Ma et al. | 370/312 |
| 2003/0011513 A1 * | 1/2003 | Zhao et al. | 342/357.09 |
| 2005/0010687 A1 | 1/2005 | Dai | |
| 2007/0086460 A1 | 4/2007 | Choi et al. | |
| 2009/0059832 A1 | 3/2009 | Jhamnani et al. | |
| 2009/0312034 A1 | 12/2009 | Burroughs et al. | |
| 2010/0041418 A1 * | 2/2010 | Edge et al. | 455/456.2 |

OTHER PUBLICATIONS

3rd Generation Partnership Project; Technical Specification Group GSM/EDGE Radio Access Network; Functional stage 2 description of Location Services (LCS) in GERAN (Release 8) 3GPP Standard; 3GPP TS 43.059, 3rd Generation Partnership Project (3GPP), Mobile Competence Centre; 650, Route Des Lucioles; F-06921 Sophia Antipolis Cedex; France, No. V8.1.0, Aug. 1, 2008, pp. 1-69, XP050378156, chapter 1 "Scopre", chapter 6.1.2 "Message Segmentation in A/Gb mode", chapter 9.4.6 "Broadcast of Assistance Data".
3rd Generation Partnership Project; Technical Specification Group Services and System Aspects; Evaluation of LCS Control Plane Solutions for EPS (Release 9) 3GPP Standard; 3GPP TR 23.891, 3rd Generation Partnership Project (3GPP), Mobile Competence Centre ; 650, Route Des Lucioles; F-06921 Sophia-Antipolis Cedex; France, No. V. 1.0.0, Mar. 1, 2009, pp. 1-64, XP050364141.
International Search Report—PCT/US2010/027217, International Search Authority—European Patent Office—Jun. 23, 2010.
Written Opinion—PCT/US2010/027217—ISA/EPO—Jun. 23, 2010.

* cited by examiner

*Primary Examiner* — Melody Mehrpour
(74) *Attorney, Agent, or Firm* — John J. Ketchum

(57) ABSTRACT

Certain aspects of the present disclosure propose a method for providing positioning assistance data and other supporting information for positioning methods in a wireless communication system utilizing the long term evolution (LTE) standard. The positioning assistance data may be sent in a packet to a radio network node. The radio network node may broadcast the packet to one or more user equipments.

30 Claims, 7 Drawing Sheets

METHOD AND APPARATUS FOR PROVIDING POSITION RELATED DATA

CLAIM OF PRIORITY UNDER 35 U.S.C. §119

The present Application for Patent claims benefit of U.S. Provisional Patent Application Ser. No. 61/159,765, entitled, "Method and Apparatus for Providing Position Related Data," filed Mar. 12, 2009, and assigned to the assignee hereof and hereby expressly incorporated by reference herein.

TECHNICAL FIELD

Certain aspects of the present disclosure generally relate to wireless communications and more particularly, to systems and methods for broadcasting position assistance data in a wireless communication system.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for wireless communications by an apparatus. The method generally includes generating a message in a higher layer protocol, wherein the message comprises assistance positioning data, and transmitting the message to a radio network node, wherein the radio network node broadcasts the message to one or more user equipments.

Certain aspects of the present disclosure provide a method for wireless communications by an apparatus. The method generally includes receiving a message, wherein the message is not intended for use by the apparatus, determining if the message was intended for a broadcast delivery, and broadcasting the message to one or more user equipments using a radio layer protocol if the message was intended for the broadcast delivery.

Certain aspects of the present disclosure provide an apparatus for wireless communications by an apparatus. The apparatus generally includes logic for generating a message in a higher layer protocol, wherein the message comprises assistance positioning data, and logic for transmitting the message to a radio network node, wherein the radio network node broadcasts the message to one or more user equipments.

Certain aspects of the present disclosure provide an apparatus for wireless communications by an apparatus. The apparatus generally includes logic for receiving a message, wherein the message is not intended for use by the apparatus, logic for determining if the message was intended for a broadcast delivery, and logic for broadcasting the message to one or more user equipments using a radio layer protocol if the message was intended for the broadcast delivery.

Certain aspects of the present disclosure provide an apparatus for wireless communications by an apparatus. The apparatus generally includes means for generating a message in a higher layer protocol, wherein the message comprises assistance positioning data, and means for transmitting the message to a radio network node, wherein the radio network node broadcasts the message to one or more user equipments.

Certain aspects of the present disclosure provide an apparatus for wireless communications by an apparatus. The apparatus generally includes means for receiving a message, wherein the message is not intended for use by the apparatus, means for determining if the message was intended for a broadcast delivery, and means for broadcasting the message to one or more user equipments using a radio layer protocol if the message was intended for the broadcast delivery.

Certain aspects provide a computer-program product for wireless communications, comprising a computer-readable medium having instructions stored thereon, the instructions being executable by one or more processors. The instructions generally include instructions for generating a message in a higher layer protocol, wherein the message comprises assistance positioning data, and instructions for transmitting the message to a radio network node, wherein the radio network node broadcasts the message to one or more user equipments.

Certain aspects provide a computer-program product for wireless communications, comprising a computer-readable medium having instructions stored thereon, the instructions being executable by one or more processors. The instructions generally include instructions for receiving a message, wherein the message is not intended for use by the apparatus, instructions for determining if the message was intended for a broadcast delivery, and instructions for broadcasting the message to one or more user equipments using a radio layer protocol if the message was intended for the broadcast delivery.

Certain aspects of the present disclosure provide an apparatus for wireless communications. The apparatus generally includes at least one processor configured to generate a message in a higher layer protocol, wherein the message comprises assistance positioning data, and transmit the message to a radio network node, wherein the radio network node broadcasts the message to one or more user equipments.

Certain aspects of the present disclosure provide an apparatus for wireless communications. The apparatus generally includes at least one processor configured to receive a message, wherein the message is not intended for use by the apparatus, determine if the message was intended for a broadcast delivery, and broadcast the message to one or more user equipments using a radio layer protocol if the message was intended for the broadcast delivery.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
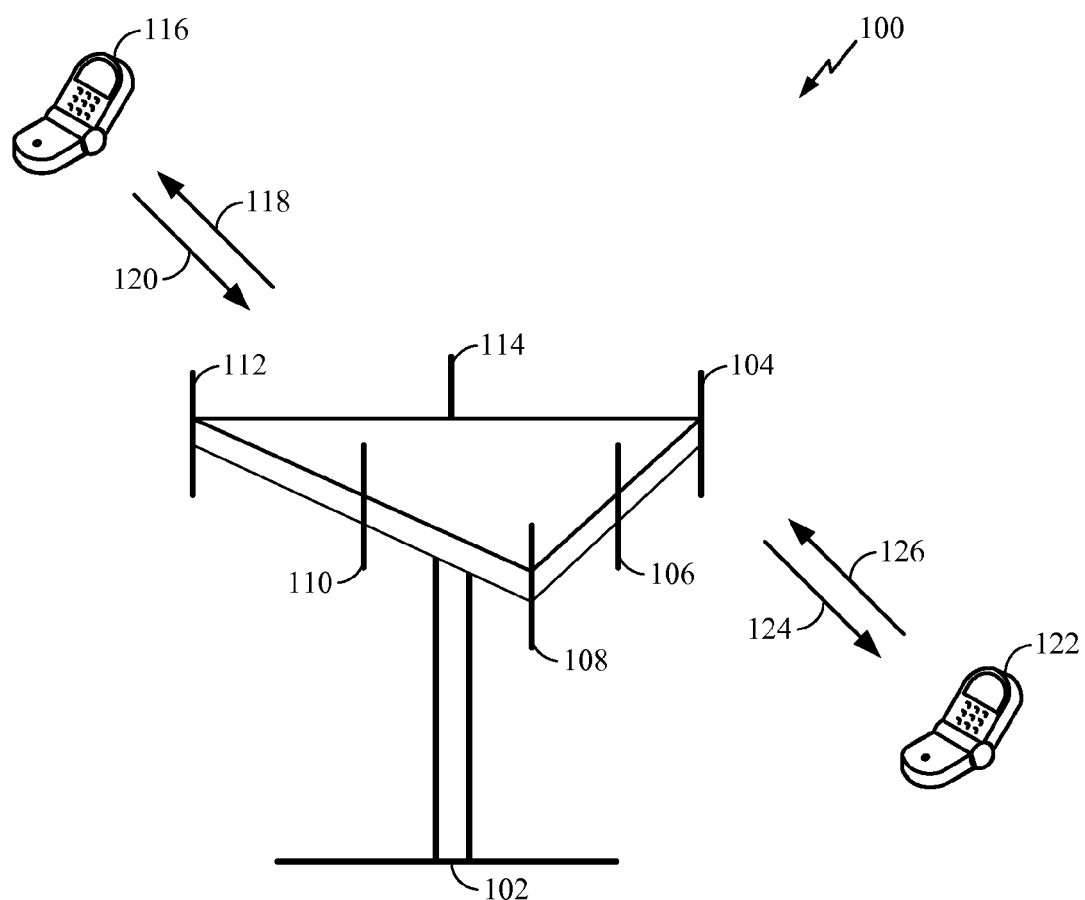
FIG. 1 illustrates a multiple access wireless communication system, in accordance with certain aspects of the present disclosure.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
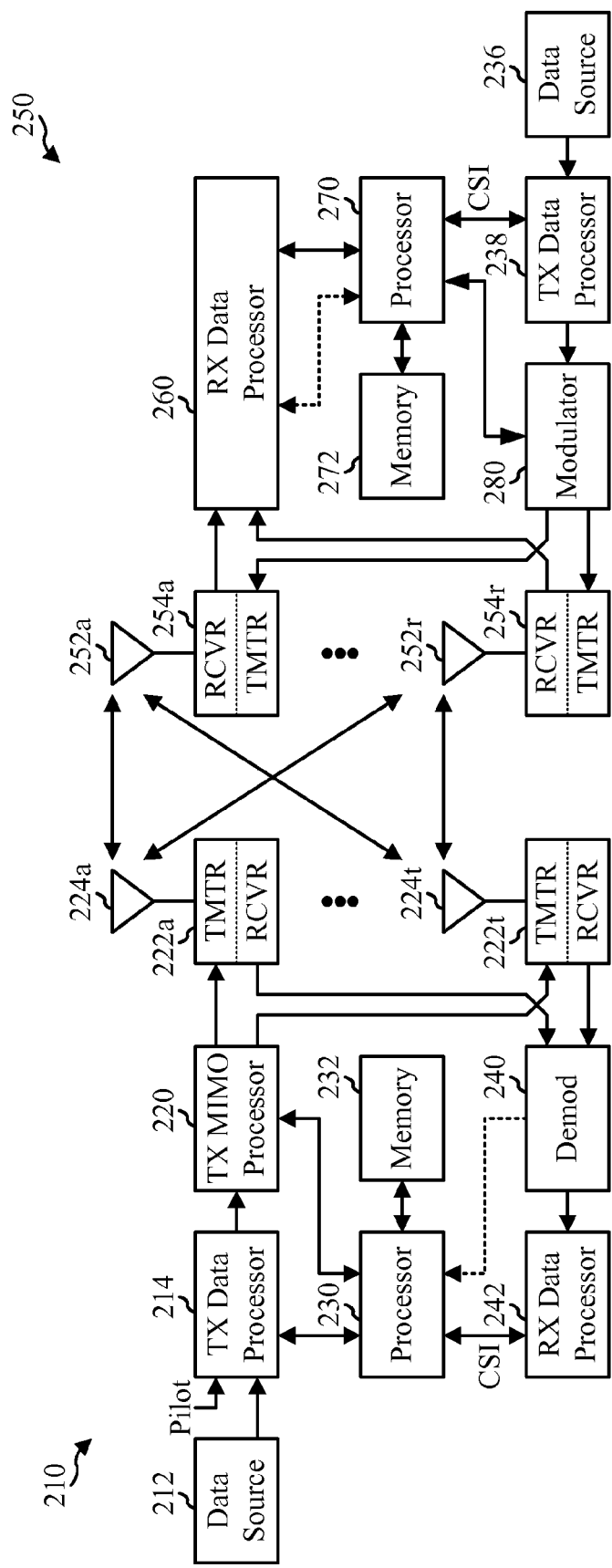
FIG. 2 illustrates a block diagram of a communication system, in accordance with certain aspects of the present disclosure.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights then processes the extracted message.

Figure 3:
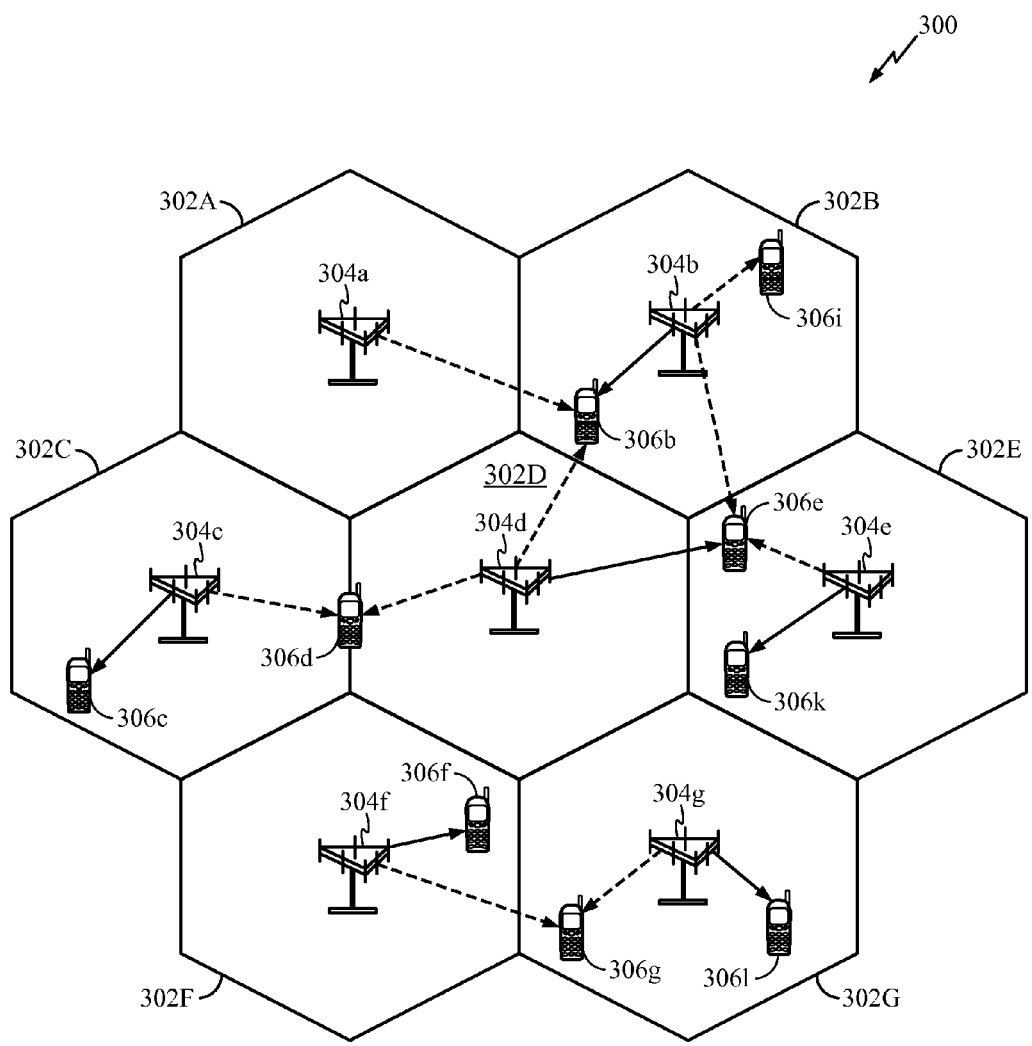
FIG. 3 illustrates an example wireless communication system, in accordance with certain aspects of the present disclosure.

FIG. 3 illustrates an example wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g., to serve one or more frequencies). Various access terminals (ATs) 306, including ATs 306a-306k, also known interchangeably as user equipment (UE) or mobile stations, are dispersed throughout the system.

Each UE 306 may communicate with one or more APs 304 on a forward link (FL) and/or a reverse link (RL) at a given moment, depending upon whether the UE is active and whether it is in soft handoff, for example. The wireless communication system 300 may provide service over a large geographic region, for example, macro cells 302a-302g may cover a few blocks in a neighborhood.

Method and Apparatus for Providing Position Related Data

Certain aspects of the present disclosure propose a method for providing positioning assistance data and other supporting information for positioning methods in a wireless communication system utilizing the long term evolution (LTE) standard. The positioning assistance data may be sent in a packet to a radio network node. The radio network node may broadcast the packet to one or more user equipments (UEs).

A control-plane positioning in the LTE standard is supported by a protocol called the LTE Positioning Protocol (LPP), terminated at the UE and a higher-layer network entity, such as an evolved serving mobile location center (E-SMLC). The LPP protocol utilizes point-to-point transport of positioning data to the UEs.

Figure 4:
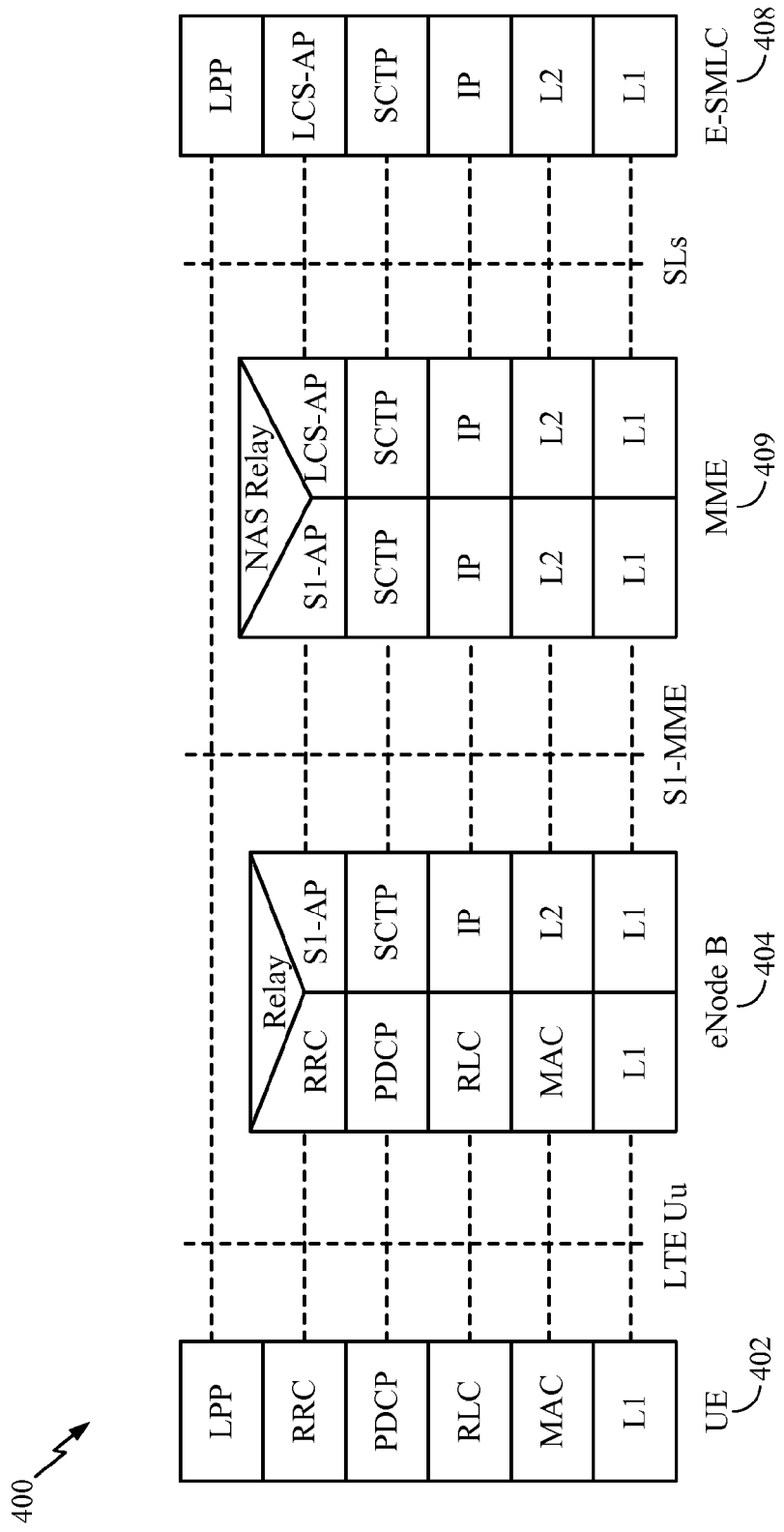
FIG. 4 illustrates an example protocol layering for the long term evolution (LTE) positioning protocol (LPP) according to the LTE standard.

FIG. 4 illustrates an example network architecture and protocol layering for the LPP protocol according to the LTE standard. As illustrated, the network may include a UE 402, an eNode B 404, a mobility management entity (MME) 406 and an evolved serving mobile location center (E-SMLC) 408. In this architecture, the UE may communicate with the eNode B and the E-SMLC. In addition, the eNode B may communicate with the UE and the MME and the MME may communicate with the E-SMLC and the eNode B.

The UE may communicate with the E-SMLC using an LPP layer. At the UE, the LPP may operate over Radio Resource Control (RRC), Packet Data Convergence Protocol (PDCP), Radio Link Control (RLC), and Medium Access Control (MAC), and physical layer or Layer 1 (L1).

The eNode B may communicate with the UE via RRC, PDCP, RLC, MAC and L1 layers. The eNode B may also communicate with the MME via S1 Application Protocol (S1-AP), Stream Control Transmission Protocol (SCTP), Internet Protocol (IP), data link layer (Layer 2, L2) and L1 layer. The MME may communicate with the E-SMLC via LCS Application Protocol (LCS-AP), SCTP, IP, L2 and L1 layers.

In standards such as the Universal Mobile Telecommunications System (UMTS), Global System for Mobile communications (GSM), and a large family of systems descended from the Interim Standard 95 (IS-95), assistance data is delivered for positioning. For example, satellite ephemeris for Global Positioning System (GPS) or Global Navigation Satellite System (GNSS) may be delivered via broadcast, using the underlying radio protocol for delivery. However, the protocol model illustrated in FIG. 4 precludes the broadcast of assistance data. It may also be desirable for protocol-architecture reasons to "insulate" the LPP layer from other radio-layer protocols.

Certain aspects of the present disclosure propose a method in which assistance data and potentially any other "metadata" for a particular positioning method are delivered through LPP in a container. Assistance data may refer to the information required by a positioning system, but outside the actual transaction of requesting and delivering a positioning measurement. In the proposed method, instead of unicast delivery within the existing point-to-point LPP protocol model, facilities of a radio-layer protocol may be used to schedule the assistance data for broadcast transmission.

Figure 5:
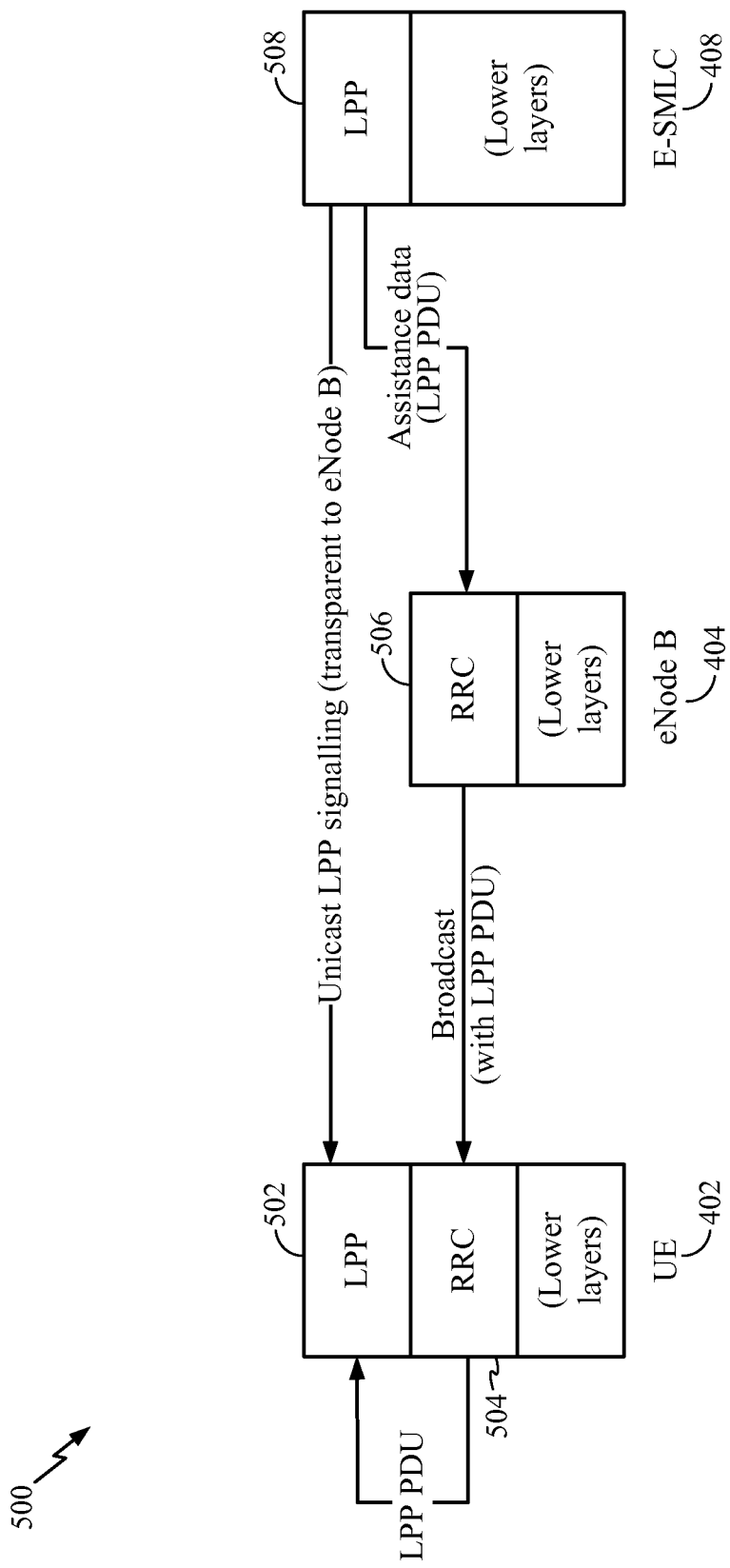
FIG. 5 illustrates an example data flow through protocol stack for broadcast delivery of assistance data, in accordance with certain aspects of the present disclosure.

FIG. 5 illustrates an example data flow through part of the protocol stack illustrated in FIG. 4 for broadcast delivery of assistance data, in accordance with certain aspects of the present disclosure.

As illustrated, the LLP layer 508 in the E-SMLC 408 may transmit some of the LPP packets through unicast LPP signaling to the UE 402, which may be transparent to the eNode B. The E-SMLC 408 may also transmit assistance data that is encapsulated as an LPP protocol data unit (PDU) to the eNode B. It should be noted that the eNode B may not be one of the LPP protocol endpoints associated with the E-SMLC.

The eNode B may receive the LPP PDU from the E-SMLC and recognize that the packet is intended for broadcast delivery. The eNode B 404 may then broadcast the LPP PDU utilizing its RRC layer 506. The UE may receive the broadcasted LPP PDU and send the PDU from its RRC layer 504 to the LPP layer 502 for further processing.

For certain aspects of the present disclosure, some of the PDUs of the LPP protocol may be "intercepted" by the eNode B for special treatment in the RRC layer (e.g., broadcast transmission). The behavior in which the eNode B "peeks" into a protocol that does not terminate there may be considered as a layering violation, or it may be viewed as a small additional protocol terminated between the E-SMLC and the eNode B. However, the modeling distinction may not have any functional impact on the design.

Figure 6:
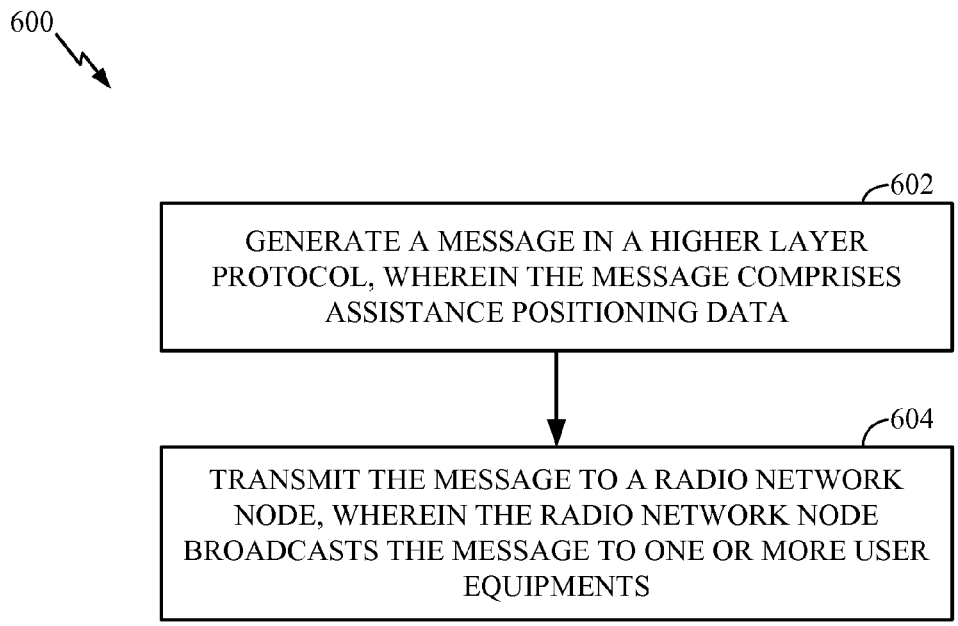
FIG. 6 illustrates example operations for container transport of positioning assistance data that may be performed by an evolved serving mobile location center (E-SMLC), in accordance with certain aspects of the present disclosure.

FIG. 6 illustrates example operations for container transport of positioning assistance data that may be performed by an E-SMLC, in accordance with certain aspects of the present disclosure. At 602, the E-SMLC generates a message in a higher layer protocol. For example, the message may include assistance positioning data that are formulated in a 'container' and the higher layer protocol may be the LPP layer.

At 604, the E-SMLC transmits the message to an eNode B. For certain aspects, the E-SMLC may also provide additional information to the eNode B. By utilizing the additional information, the eNode B may be able to distinguish messages that should be transmitted via broadcast from other messages delivered from the E-SMLC. For certain aspects, messages of the E-SMLC that are not intended for broadcast scheduling may be forwarded transparently by the eNode B to a UE, e.g., as messages of a transport protocol terminated at the UE.

Figure 7:
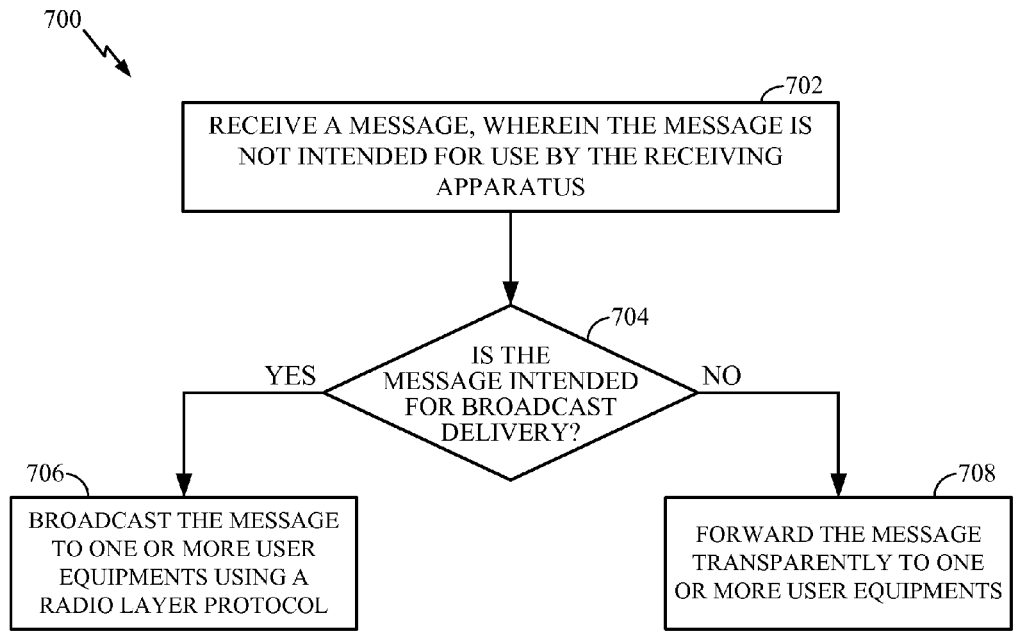
FIG. 7 illustrates example operations for container transport of positioning assistance data that may be performed by an evolved Node B, in accordance with certain aspects of the present disclosure.

FIG. 7 illustrates example operations for container transport of positioning assistance data that may be performed by an eNode B, in accordance with certain aspects of the present disclosure. At 702, the eNode B receives a message from the E-SMLC, wherein the message is generated by an LPP layer. At 704, the eNode B determines if the message is intended for broadcast delivery. For certain aspects, the eNode B may intercept the message and look for information regarding whether or not the message is intended for broadcast delivery.

At 706, the eNode B broadcasts the message to a UE using a radio layer protocol if the message was intended for broadcast delivery. The radio layer protocol may, for example, be the RRC layer. At 708, the eNode B may forward the message transparently to one or more UEs if the message is not intended for broadcast delivery.

For certain aspects, the eNode B may repeat the broadcast using a periodic schedule. For certain aspects, the eNode B may segment the contents of a single container across multiple broadcast messages. For example, if contents of the container do not fit in one broadcast message, the contents may be segmented into two or more broadcast messages before transmission to the UE.

For certain aspects, the eNode B may interpret at least one data element from the LPP layer to determine whether a message should be transmitted via broadcast.

Aspects of the present disclosure proposed methods for container transport of positioning assistance data in the LTE standard. However, one skilled in the art could apply the proposed methods to other standards without departing from the scope of this disclosure.

Figure 6A:
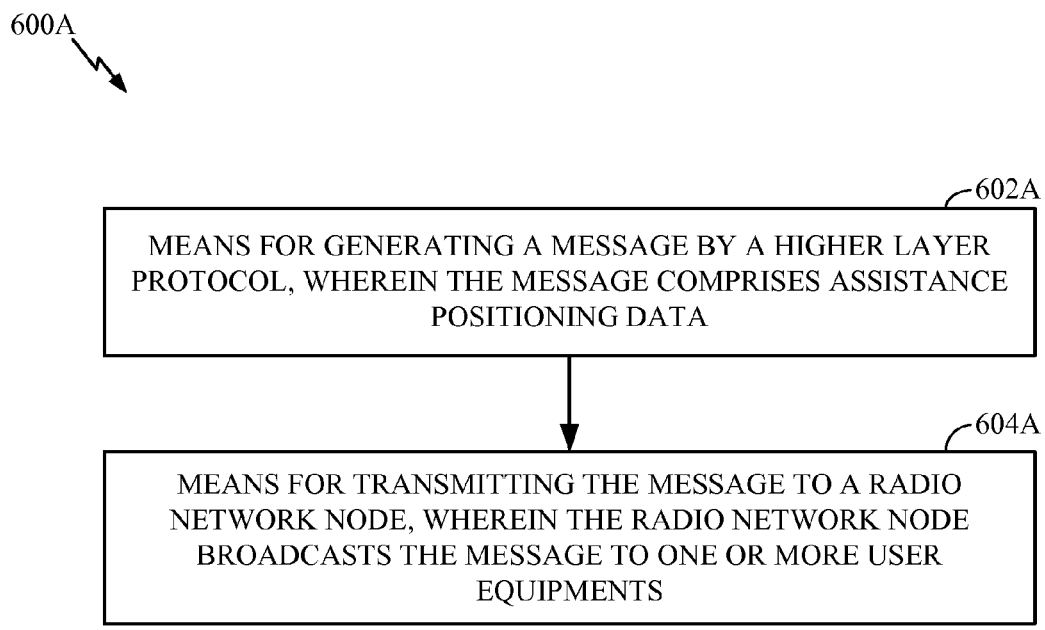
FIG. 6A illustrates example components capable of performing the operations illustrated in FIG. 6.
Figure 7A:
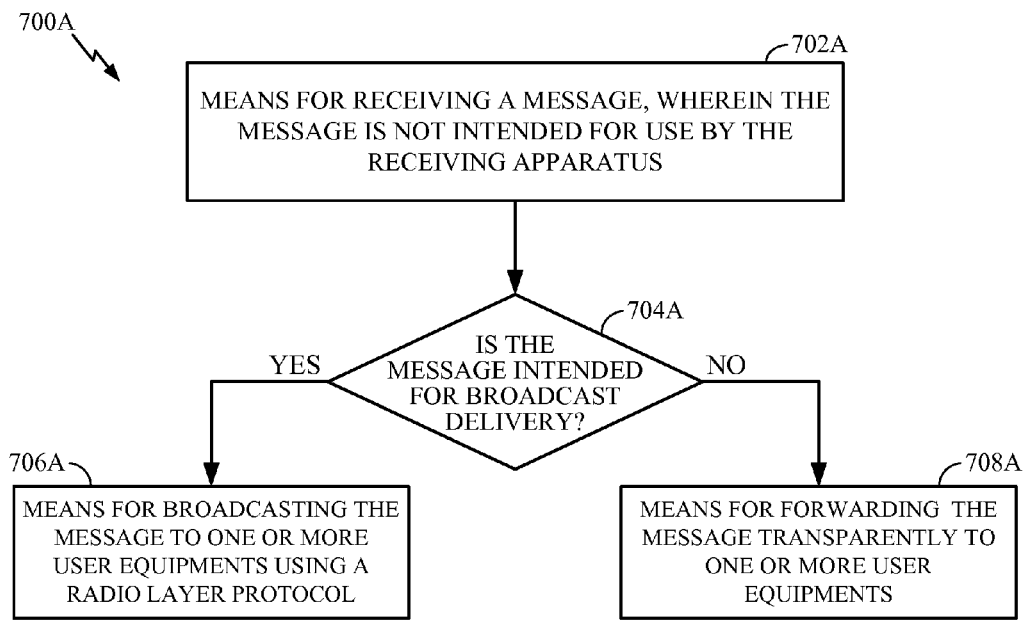
FIG. 7A illustrates example components capable of performing the operations illustrated in FIG. 7.

The various operations of methods described above may be performed by various hardware and/or software component(s) and/or module(s) corresponding to means-plus-function blocks illustrated in the Figures. For example, blocks 602-604 illustrated in FIG. 6 correspond to means-plus-function blocks 602A-604A illustrated in FIG. 6A. In addition, blocks 702-708 illustrated in FIG. 7 correspond to means-plus-function blocks 702A-708A illustrated in FIG. 7A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications by an apparatus, comprising:
   generating a message in a higher layer protocol, wherein the message comprises assistance positioning data; and
   transmitting the message to a radio network node, wherein the radio network node broadcasts the message to a plurality of user equipments.

2. The method of claim 1, wherein the radio network node is an evolved Node B (eNode B).

3. The method of claim 1, wherein the higher layer protocol comprises long term evolution (LTE) positioning protocol (LPP).

4. The method of claim 1, wherein the higher layer protocol does not have the radio network node as one of its endpoints.

5. The method of claim 1, wherein the message comprises information regarding whether or not the message should be broadcasted by the radio network node.

6. The method of claim 1, wherein the apparatus is an Evolved Serving Mobile Location Center (E-SMLC).

7. A method for wireless communications by an apparatus, comprising:
   receiving a message generated in a higher layer protocol, wherein the message is not intended for use by the apparatus;

determining if the message was intended for a broadcast delivery; and broadcasting the message to a plurality of user equipments using a radio layer protocol if the message was intended for the broadcast delivery.

8. The method of claim 7, wherein the message is generated by a Long Term Evolution (LTE) Positioning Protocol (LPP) layer in an Evolved Serving Mobile Location Center (E-SMLC).

9. The method of claim 7, wherein broadcasting is repeated based on a periodic schedule.

10. The method of claim 7, wherein the apparatus is an Evolved Node B.

11. The method of claim 7, further comprising:
segmenting the message into two or more sub-messages; and
broadcasting the sub-messages to the plurality of user equipments.

12. The method of claim 7, further comprising:
forwarding the message to the user equipments if the message is not intended for the broadcast delivery.

13. An apparatus for wireless communications, comprising:
logic for generating a message in a higher layer protocol, wherein the message comprises assistance positioning data; and
logic for transmitting the message to a radio network node, wherein the radio network node broadcasts the message to a plurality of user equipments.

14. The apparatus of claim 13, wherein the radio network node is an evolved Node B (eNode B).

15. The apparatus of claim 13, wherein the higher layer protocol comprises long term evolution (LTE) positioning protocol (LPP).

16. The apparatus of claim 13, wherein the higher layer protocol does not have the radio network node as one of its endpoints.

17. The apparatus of claim 13, wherein the message comprises information regarding whether or not the message should be broadcasted by the radio network node.

18. The apparatus of claim 13, wherein the apparatus is an Evolved Serving Mobile Location Center (E-SMLC).

19. An apparatus for wireless communications, comprising:
logic for receiving a message generated in a higher layer protocol, wherein the message is not intended for use by the apparatus;
logic for determining if the message was intended for a broadcast delivery; and
logic for broadcasting the message to a plurality of user equipments using a radio layer protocol if the message was intended for the broadcast delivery.

20. The apparatus of claim 19, wherein the message is generated by a Long Term Evolution (LTE) Positioning Protocol (LPP) layer in an Evolved Serving Mobile Location Center (E-SMLC).

21. The apparatus of claim 19, wherein the broadcasting is repeated based on a periodic schedule.

22. The apparatus of claim 19, wherein the apparatus is an Evolved Node B.

23. The apparatus of claim 19, further comprising:
logic for segmenting the message into two or more sub-messages; and
logic for broadcasting the sub-messages to the plurality of user equipments.

24. The apparatus of claim 19, further comprising:
logic for forwarding the message to the user equipments if the message is not intended for the broadcast delivery.

25. An apparatus for wireless communications, comprising:
means for generating a message in a higher layer protocol, wherein the message comprises assistance positioning data; and
means for transmitting the message to a radio network node, wherein the radio network node broadcasts the message to a plurality of user equipments.

26. An apparatus for wireless communications, comprising:
means for receiving a message generated in a higher layer protocol, wherein the message is not intended for use by the apparatus;
means for determining if the message was intended for a broadcast delivery; and
means for broadcasting the message to a plurality of user equipments using a radio layer protocol if the message was intended for the broadcast delivery.

27. A computer-program product for wireless communications by an apparatus, comprising a non-transitory computer-readable medium having instructions stored thereon, the instructions being executable by one or more processors and the instructions comprising:
instructions for generating a message in a higher layer protocol, wherein the message comprises assistance positioning data; and
instructions for transmitting the message to a radio network node, wherein the radio network node broadcasts the message to a plurality of user equipments.

28. A computer-program product for wireless communications by an apparatus, comprising a non-transitory computer-readable medium having instructions stored thereon, the instructions being executable by one or more processors and the instructions comprising:
instructions for receiving a message generated in a higher layer protocol, wherein the message is not intended for use by the apparatus;
instructions for determining if the message was intended for a broadcast delivery; and
instructions for broadcasting the message to a plurality of user equipments using a radio layer protocol if the message was intended for the broadcast delivery.

29. An apparatus for wireless communications, comprising at least one processor configured to:
generate a message in a higher layer protocol, wherein the message comprises assistance positioning data; and
transmit the message to a radio network node, wherein the radio network node broadcasts the message to a plurality of user equipments.

30. An apparatus for wireless communications, comprising at least one processor configured to:
receive a message generated in a higher layer protocol, wherein the message is not intended for use by the apparatus;
determine if the message was intended for a broadcast delivery; and
broadcast the message to a plurality of user equipments using a radio layer protocol if the message was intended for the broadcast delivery.

* * * * *